Nov. 12, 1968  A. L. JOHNSON, JR., ET AL  3,410,456
SEALING PLUG FOR A CONTAINER
Filed May 22, 1967  3 Sheets-Sheet 1
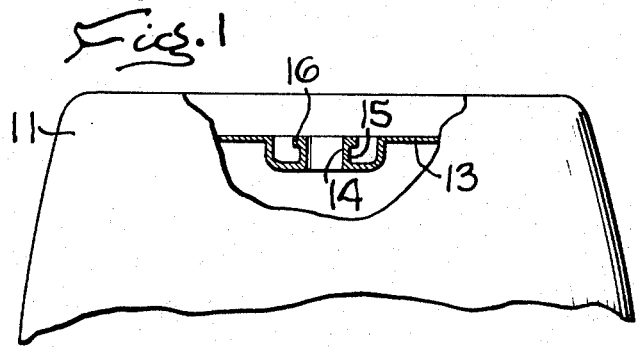
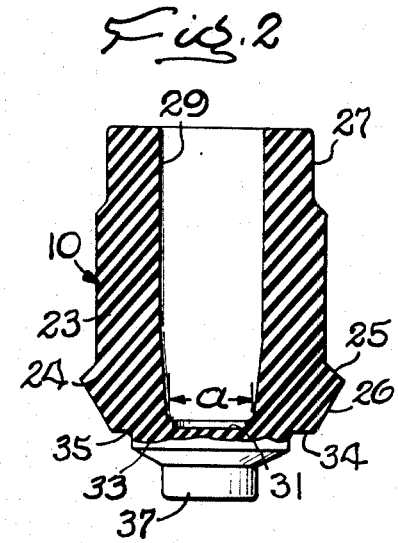
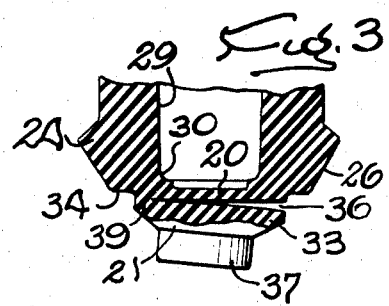
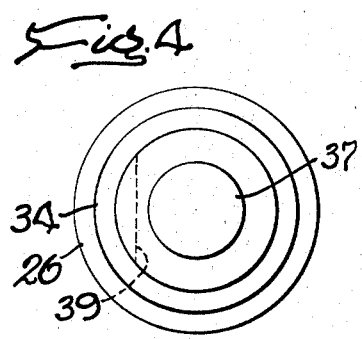
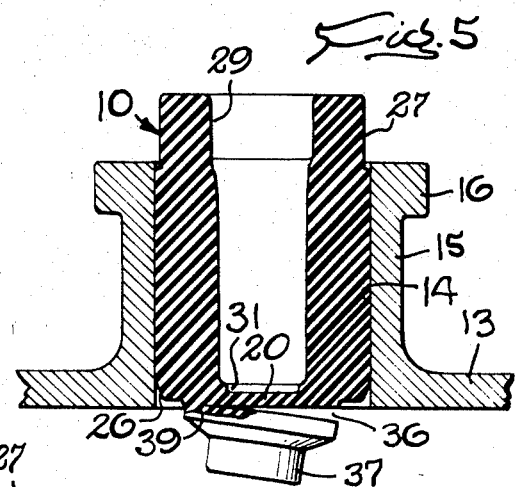
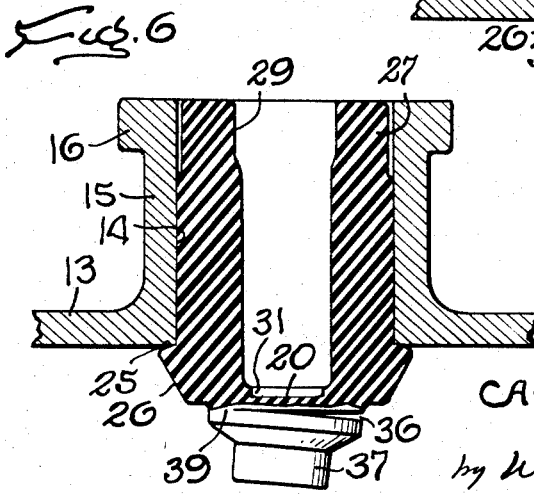
INVENTORS
Arthur L. Johnson Jr.
Marlow W. Dodge
by Wolfe, Hubbard, Voit & Osann
ATTORNEYS

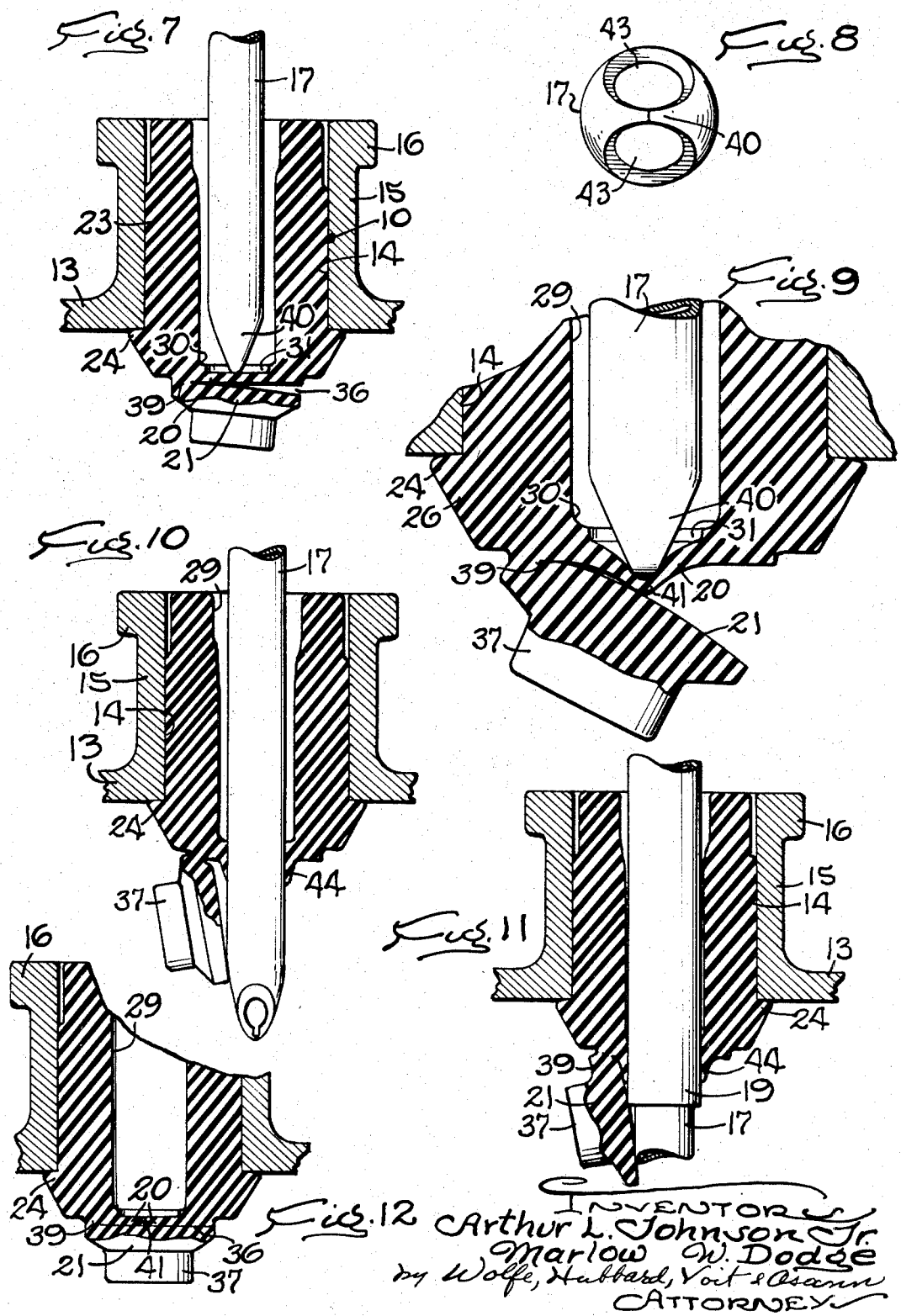

Nov. 12, 1968     A. L. JOHNSON, JR., ET AL     3,410,456
SEALING PLUG FOR A CONTAINER
Filed May 22, 1967     3 Sheets-Sheet 3
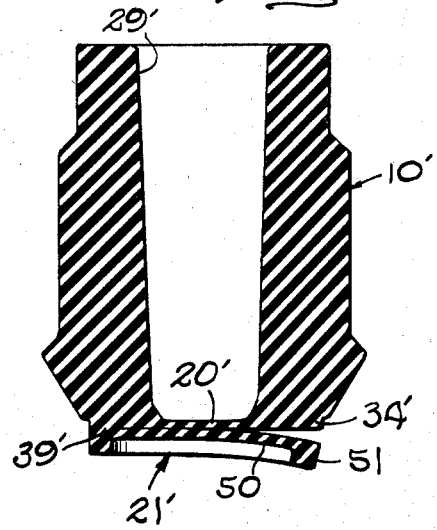
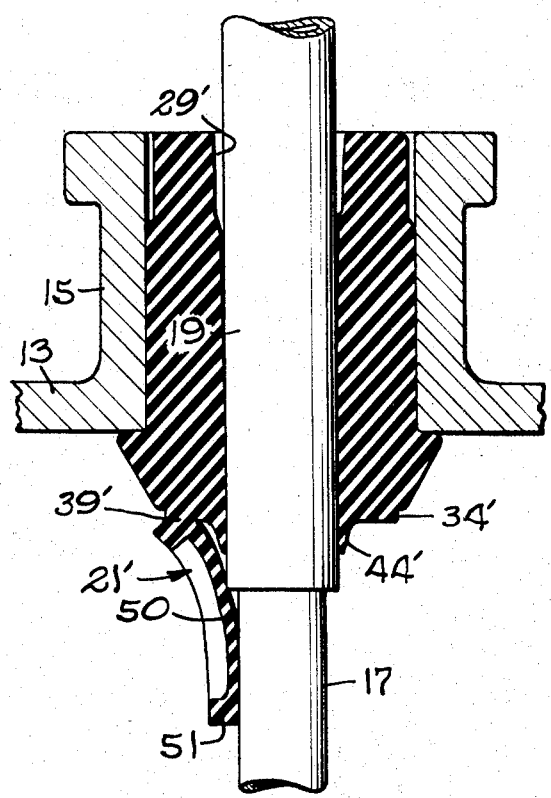
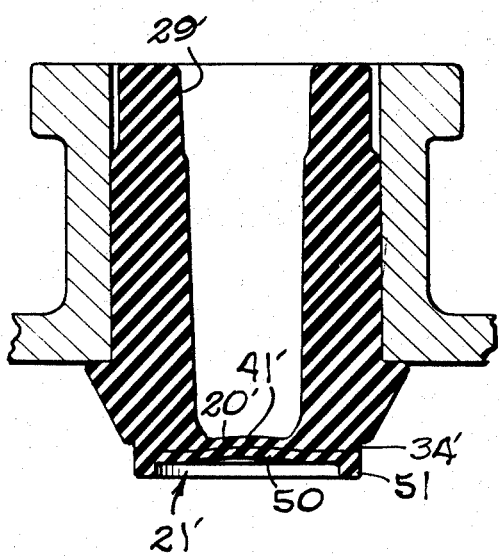
INVENTORS
Arthur L. Johnson Jr
Marlow W. Dodge
by Wolfe, Hubbard, Voit & Osann
ATTORNEYS

United States Patent Office 3,410,456
Patented Nov. 12, 1968

3,410,456
SEALING PLUG FOR A CONTAINER
Arthur L. Johnson, Jr., Rockford, and Marlow W. Dodge, Loves Park, Ill., assignors to Johnson Enterprises, Inc., Rockford, Ill., a corporation of Illinois
Filed May 22, 1967, Ser. No. 640,012
8 Claims. (Cl. 222—82)

ABSTRACT OF THE DISCLOSURE

A plug made of resiliently yieldable rubber and formed with a thin membrane for sealing the tap hole of a beer keg. As the draw tube and the gas tube of a tap are inserted into the keg, the membrane is punctured and seals around the gas tube to establish a seal between the tap and the keg. A hinged flapper formed integrally with the inner end of the plug seals the puncture in the membrane and reseals the keg when the tap is removed from the keg.

Background of the invention

This invention relates to a sealing plug adapted to fit into and close a hole in a container holding pressurized fluid and, more particularly, to a sealing plug for closing a hole through which a tube may be inserted into the container for the purpose of withdrawing the fluid from the container.

Summary of the invention

The primary aim of the present invention is to provide a new and improved sealing plug of the above character which not only seals the container both before insertion of the tube into and after removal of the tube from the container but which also automatically seals around the tube while the latter is in the container thereby to do away with the need of establishing a separate seal between the tube and the container. In a more detailed aspect, the invention contemplates a sealing plug formed with a resiliently flexible membrane initially sealing the container and adapted to be punctured and to seal around the tube as an incident to insertion of the tube through the plug and into the container. After removal of the tube, the container is resealed automatically by a hinged flapper formed integrally with the plug.

The invention also resides in the novel construction of the plug establishing a tight seal around both the tube and the container while enabling easy removal of the tube from the plug and allowing easy removal of the plug from the container.

Brief description of the drawings

FIGURE 1 is an elevational view of an exemplary container adapted to be closed by a sealing plug embodying the novel features of the present invention, part of the container being broken away and shown in section.

FIG. 2 is a longitudinal cross-section of the plug during one stage of its manufacture.

FIG. 3 is a fragmentary view similar to FIG. 2 and showing the plug as completely manufactured and before being inserted into the container.

FIG. 4 is a bottom view of the plug shown in FIG. 3.

FIG. 5 is a longitudinal cross-section of the plug in a partially inserted position in the container.

FIG. 6 is a view similar to FIG. 5 and showing the plug in its final position in the container.

FIG. 7 is a view similar to FIG. 6 and showing the first step of inserting the tube into the container.

FIG. 8 is a bottom view of the lower end of the tube.

FIGS. 9 to 11 are views similar to FIG. 7 and showing the successive steps of inserting the tube into the container.

FIG. 12 is a view similar to FIG. 7 and showing the plug after the tube has been removed from the container.

FIG. 13 is a view similar to FIG. 3 and showing a modified plug.

FIG. 14 is a view similar to FIG. 11 and showing the modified plug with the tube inserted into the container.

FIG. 15 is a view similar to FIG. 12 and showing the modified plug after the tube has been removed from the container.

Detailed description

As shown in the drawings for purposes of illustration, the invention is embodied in a sealing plug 10 for closing a container such as a keg 11 of draft beer which may be dispensed from the keg through a tap inserted into the keg. In this instance, the keg includes a head 13 formed with a tap hole 14 defined by a tubular neck 15 projecting upwardly from the head. The tap is adapted to be fastened to a flange 16 formed around the upper end of the neck and includes a draw tube 17 (FIG. 7) which projects into the keg through the tap hole. Air or carbon dioxide under pressure for forcing the beer upwardly through the draw tube may be admitted into the keg through a gas tube 19 (FIG. 11) telescoped over the upper end of the draw tube in fixed relationship with the draw tube. The tap illustrated herein is of the type disclosed in our copending application Ser. No. 640,292. filed May 22, 1967 to which reference is made for a more complete description of the detailed construction of the tap.

The present invention contemplates a new and extremely simple sealing plug 10 for sealing the beer within the keg 11 before the latter is tapped, for establishing a fluid-tight seal between the keg and the tap while the tap is in the keg, and then for resealing the keg after the tap has been removed so as to prevent dirt and water from entering into the keg and to prevent any remaining beer from leaking out of the keg during its return to the brewery. For these purposes, the plug is formed with a thin, yieldable membrane 20 which initially seals the keg and which is punctured by the draw tube 17 as the latter is inserted through the plug and into the keg. The torn edges of the membrane resiliently embrace and seal against the tube thereby to prevent the escape of pressure from the keg without need of an additional sealing connection between the keg and the tap. After the tube has been withdrawn from the keg, a hinged flapper 21 on the end of the plug automatically seals off the puncture in the membrane to reseal the keg during transit.

Herein, the plug 10 is a one-pipe molding made of rubber or other resiliently yieldable material and is adapted to telescope snugly into the tap hole 14. The plug is generally cylindrical in shape and is formed with an intermediate body portion 23 slightly greater in diameter than the diameter of the hole. Just below the intermediate portion is an enlarged bead 24 encircling the plug and defining an upwardly facing shoulder 25. The lower end portion of the bead is formed with a downwardly and inwardly tapering surface 26 which facilitates initial insertion of the plug into the upper end of the hole.

As the plug 10 is telescoped downwardly into the tap hole 14, the bead 24 and the intermediate body portion 23 are compressed radially inwardly by the walls of the hole (see FIG. 5). Upon passing through the hole, the bead expands and the upwardly facing shoulder 25 snaps beneath the lower edges of the hole (see FIG. 6) and engages the lower surface of the head 13 to prevent the plug from being pulled outwardly from the hole with the draw tube 17 when the tap is removed from the keg. The intermediate body portion 23 remains compressed within the hole and thus is urged by its own resiliency into tight sealing engagement with the walls of the hole to prevent leakage along the outer sides of the plug.

After the keg 11 has been emptied and returned to the brewery, the plug 10 usually is knocked out of the tap hole 14 and into the inside of the keg. The plug is washed out of the keg through the bung hole (not shown) during cleaning of the keg and is replaced subsequently by a new plug. To facilitate removal of the plug from the tap hole, the upper end portion 27 of the plug is made smaller in diameter than the body portion 23 and is spaced radially inwardly from the walls of the hole (see FIG. 6) when the plug is telescoped into the hole. With this arrangement, the compressed body portion 23 fits sufficiently tight in the hole to establish a seal and to prevent the plug from being pushed into the keg as the membrane is punctured during insertion of the draw tube 17, while the relieved upper end portion 27 insures that the plug will not be wedged so tightly as to prevent a workman at the brewery from knocking the plug into the keg. Moreover, with the upper end portion of the plug relieved, there is no danger that the compressed rubber will flow upwardly and form a lip around the flange 16 restricting removal of the plug.

To permit insertion of the draw tube 17 into the keg 11, the plug 10 is formed with a downwardly tapering longitudinal bore 29 which is considerably larger than the diameter of the tube before the plug is wedged into the tap hole 14. With the rubber material compressed when the plug is inserted into the hole, the minor diameter $a$ (FIG. 2) of the bore is reduced to a dimension just slightly larger than the diameter of the draw tube 17 and approximately equal to the diameter of the gas tube 19. At its lower end, the bore is formed with a short inwardly curving radius 30 (FIGS. 3 and 7) which merges gradually with the walls of a recess 31 formed at the lower end of the bore and slightly smaller in diameter than the gas tube.

As the plug 10 is initially molded, the lower end of the bore 29 is closed by a substantially cylindrical rubber segment 33 (FIG. 2) which protrudes downwardly from the lower end 34 of the plug just below the bead 24 and which eventually becomes the membrane 20 and the flapper 21. The rubber segment 33 is smaller in diameter than the lower end 34 of the plug and merges with the lower end on a gradually curving radius 35. After the plug has been molded, the rubber segment is slit horizontally part way across its width and along a line spaced just below the lower end of the bore 29 as indicated at 36 in FIG. 3 thereby to separate the segment into a first part forming the flapper 21 and a second part forming the membrane 20. A short knob 37 of reduced diameter preferably is formed at the lower end of the flapper to permit the rubber segment 33 to be held firmly while the rubber is being sliced. The slit 36 stops short of extending across the entire width of the segment 33 thereby leaving a small amount of rubber defining a short hinge 39 disposed radially outwardly of the bore and hingedly connecting the flapper to the plug. The hinge line preferably is spaced downwardly from the lower end 34 of the plug to leave clearance permitting the rubber adjacent the hinge to fold freely without engaging the lower end of the plug when the flapper is swung downwardly about the hinge.

As shown in FIG. 3, the rubber of the segment 33 immediately above the slit 36 is left extending across the recess 31 at the lower end of the bore 29 thereby to form the membrane 20 which herein is about 0.025 of an inch thick. With this arrangement, the membrane 20 initially seals the bore 29 to prevent leakage of the beer through the bore and to prevent the beer from losing its charge during the interval between filling and tapping of the keg 11. If the membrane should happen to be punctured or otherwise destroyed during this time, the internal pressure of the beer in the keg immediately will force the flapper 21 upwardly about the hinge 39 and into pressing engagement with the lower surface of the membrane and with the rubber surrounding the membrane to preserve the seal in spite of failure of the membrane.

To tap the keg 11, the draw tube 17 simply is inserted into the upper end of the bore 29 and is telescoped downwardly as shown in FIG. 7. As the draw tube reaches the lower end of the bore, a lower end 40 of the tube engages and punctures the center of the membrane 20 as indicated at 41 in FIG. 9 and, at the same time, swings the flapper 21 downwardly about the hinge 39 to permit insertion of the tube into the keg. Preferably, the lower end of the tube is pointed to facilitate puncturing of the membrane and is formed with inlet holes 43 for admitting the beer into the tube. Continued downward telescoping of the tube stretches the torn edges of the membrane and causes the edges to fold downwardly alongside the tube (see FIG. 10) thereby forming a sealing lip 44 resiliently gripping the entire circumference of the tube and automatically establishing a seal between the tube and the plug 10. The radius 30 and the small diameter recess 31 at the bottom of the bore 29 limit the radial extent to which the membrane 20 may tear and also facilitate formation of the sealing lip 44 along well-defined lines.

As the lower end 40 of the draw tube 17 approaches the bottom of the keg 11, the gas tube 19 is telescoped into the plug 10 and is gripped by the sealing lip 44 with sufficient pressure to establish a fluid-tight seal between the plug and the gas tube but not so tightly as to prevent subsequent withdrawal of the tube from the keg. Because the plug itself seals around the tube, there is no need of making a further sealing connection between the tube and the body of the tap, and thus the usual tightening handle for making such a connection may be eliminated from the tap. In addition, the draw tube is sealed within the keg immediately upon being inserted into the keg so that the danger of the charged beer spewing out along the tube is eliminated.

After the keg 11 has been emptied, the tap is unfastened from the flange 16, and the tubes 17 and 19 are withdrawn through the bore 29. The dregs and the remaining gas in the keg create sufficient pressure within the keg to force the flapper 21 upwardly about the hinge 39 and into face-to-face sealing engagement with the lower surface of the membrane 20 (see FIG. 12). As a result, the puncture 41 in the membrane is closed and the keg is resealed automatically to prevent dirt and water from contaminating the keg during its return to the brewery.

A modified sealing plug is shown in FIGS. 13 to 15 in which parts corresponding to those of the first embodiment are indicated by the same but primed reference numerals. The plug 10' is substantially identical to the plug 10 except for the construction of the flapper. In the case of the plug 10', the flapper 21' is arranged in a novel manner to seal more effectively against the punctured membrane 20' and the lower end 34' of the plug after removal of the tubes 17 and 19 from the keg 11.

For this purpose, the flapper 21' comprises a flexible web 50 of rubber which is approximately the same thickness as the membrane 20' but which is of greater diameter than the membrane so as to underlie the lower end 34' of the plug. As before, the flapper is sliced away from the lower segment of the plug as indicated at 36' and, as the draw tube 17 is telescoped into the bore 29', the flapper swings downwardly about a hinge 39'. When the tubes 17 and 19 are removed from the keg, the pressure remaining in the keg forces the flapper upwardly about the hinge and into face-to-face engagement with the lower end of the plug. Because the web 50 is thin and flexible, the pressure bows the web upwardly as shown in FIG. 15 and also bows the punctured membrane slightly up into the bore. The web conforms closely to the bowed membrane along the slit 36' to seal off the puncture 41' and to establish an extremely tight seal between the flapper and the membrane. The tight seal thus formed by the web is particularly advantageous in those instances in which the tap is removed with a considerable quantity of beer remaining in the keg since the beer will not lose its charge and the keg thus may be re-tapped at a later time.

Means are provided on the flapper 21' to prevent the flexible web 50 from being folded upwardly through the puncture 41' in the membrane 20' by the pressure in the keg 11. Herein, these means comprise a narrow reinforcing rib 51 molded integrally with the web and depending from the peripheral edge portions thereof. The rib stiffens the portions of the web disposed radially outwardly of the membrane and the bore 29' and insures that the membrane will not be bowed upwardly to such an extent that it will pass through the puncture. The rib also adds body to the flapper and reduces its flimsiness.

From the foregoing, it will be apparent that the new and improved plug 10 of the present invention is extremely simple in construction and yet seals the keg 11 both before and after the keg is tapped. Since the plug also establishes a seal between the tap and the keg, the keg can be tapped in a more convenient and trouble-free manner and the tap can be of simpler and less expensive construction than has been possible heretofore.

We claim as our invention:

1. The combination of, a walled container for holding a charged beverage and having a tap hole in one wall thereof, a tap including a draw tube for withdrawing the beverage from the container and a gas tube telescoped with said draw tube for admitting pressure fluid into the container, a seaing element comprising a substantially cylindrical plug of resiliently yieldable material telescoped snugly within said hole, said plug being formed with an axially extending bore of sufficient diameter to permit insertion of said tubes into said container through said bore, a resiliently yielydable membrane extending transversely across and closing said bore to establish a seal between the bore and the interior of said container, said membrane being sufficiently thin to be punctured by the end of the draw tube as an incident to insertion of the draw tube into the container through the bore and being left with torn edges folding inwardly along and resiliently gripping one of said tubes to form a lip establishing a seal between such tube and the plug, and a flapper formed integrally with and hinged to the inner end of said plug and adapted to be urged into face-to-face engagement with the inner end of the plug to close said bore after removal of said tubes from said container.

2. In a seal for use with a container holding pressurized fluid into which a tube is adpated to be inserted for purposes of withdrawing fluid from the container, said seal comprising a substantially cylindrical plug made of resiliently yieldable material and sized to telescope snugly but removably within a hole in an upper wall of the container, an axially extending bore formed within said plug to permit insertion of the tube into the container through the bore, a resiliently yieldable membrane formed integrally with the lower end of said plug and extending across and closing the full area of the extreme lower end portion of said bore to establish a seal between the bore and the interior of the container, said membrane being sufficiently thin to be punctured by the lower end of the tube as an incident to insertion of the tube into the bore and being left with torn edges for folding downwardly along the tube and for forming a sealing lip resiliently embracing the tube to establish a seal between the tube and the plug, and a flapper formed integrally with and hinged to the lower end of said plug along a hinge line spaced radially outwardly of said lip, said flapper being hinged for downward swinging about said line during insertion of the tube and after withdrawal of the tube, for automatic upward swinging about the hinge line into face-to-face engagement with the lower end of the plug and with said membrane.

3. A seal as defined in claim 2 further including an axially facing compressible shoulder of larger diameter than the hole encircling the lower end portion of said plug and adapted to engage the underside of the upper container wall around the hole to prevent upward removal of the plug from the hole.

4. A seal as defined in claim 3 in which the upper end portion of said plug is smaller in diameter than the hole and is spaced radially inwardly from the walls of the hole.

5. A seal as defined in claim 4 in which the walls of the lower end of the bore are formed on a gradually curving radius.

6. A seal as defined in claim 2 in which said membrane is sufficiently thin to bow upwardly into said bore under the influence of the pressure within the container, said flapper being formed with a central web and with a narrow peripheral rib encircling said web, and located radially outwardly of said bore, said web being sufficiently thin and flexible to bow upwardly against said bowed membrane and to conform closely to the latter to establish a tight seal between said membrane and said flapper.

7. A seal for use with a container into which a tube is adapted to be inserted for purposes of withdrawing fluid from the container, said seal comprising a plug made of resiliently yieldable material and sized to telescope snugly within a hole in an end of the container, an axially extending bore formed within said plug to permit insertion of the tube into the container through the bore, a membrane of resiliently yieldable material formed integrally with and extending between the walls of said bore at the extreme inner end thereof to seal off the bore and confine the fluid within the container, said membrane being sufficiently resilient to be punctured as an incident to insertion of the tube through the bore and to fold along the tube interiorly of the container and to form a sealing lip embracing the tube, and a flapper formed integrally with and hinged resiliently to the inner end portion of said plug along a line disposed substantially in the plane of the inner surface of said membrane and biased such that its membrane facing surface is normally disposed toward a face-to-face engagement with the opposed surface of said membrane to define a check valve closing the end of the bore upon removal of the tube.

8. A seal as defined in claim 7 in which said flapper comprises a thin web approximately the same thickness as said membrane, and a narrow reinforcing rib thicker than said web extending around said web to stiffen the periphery thereof.

References Cited

UNITED STATES PATENTS

| | | | |
|---|---|---|---|
| 1,241,352 | 9/1917 | Doering et al. | 222—88 |
| 1,617,066 | 2/1927 | Lush | 222—81 |
| 1,995,098 | 3/1935 | Healy | 222—82 |
| 2,226,880 | 12/1940 | Tramarollo | 222—81 |
| 2,603,076 | 7/1952 | Fukal | 222—88 X |
| 2,832,515 | 4/1958 | Barradas | 222—541 X |
| 2,860,820 | 11/1958 | Falligant | 222—82 |
| 2,907,489 | 10/1959 | Taylor | 222—541 X |
| 3,195,779 | 7/1965 | Nicko | 222—82 |
| 3,308,821 | 3/1967 | Shields | 222—81 X |

ROBERT B. REEVES, *Primary Examiner.*

KENNETH N. LEIMER, *Assistant Examiner.*